US011751227B2

United States Patent
Hu et al.

(10) Patent No.: US 11,751,227 B2
(45) Date of Patent: Sep. 5, 2023

(54) METHOD OF DETERMINING UPLINK AND DOWNLINK TRANSMISSION CONFIGURATION, METHOD OF CONFIGURING UPLINK AND DOWNLINK TRANSMISSION AND DEVICES THEREOF

(71) Applicants: China Mobile Communication Co., Ltd Research Institute, Beijing (CN); China Mobile Communications Group Co., Ltd., Beijing (CN)

(72) Inventors: Lijie Hu, Beijing (CN); Xueying Hou, Beijing (CN); Xiaodong Xu, Beijing (CN); Guangyi Liu, Beijing (CN); Yuhong Huang, Beijing (CN); Liang Xia, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 192 days.

(21) Appl. No.: 16/969,659

(22) PCT Filed: Jan. 8, 2019

(86) PCT No.: PCT/CN2019/070825
§ 371 (c)(1),
(2) Date: Aug. 13, 2020

(87) PCT Pub. No.: WO2019/157887
PCT Pub. Date: Aug. 22, 2019

(65) Prior Publication Data
US 2020/0404670 A1 Dec. 24, 2020

(30) Foreign Application Priority Data
Feb. 13, 2018 (CN) .......................... 201810149220.9

(51) Int. Cl.
*H04W 72/53* (2023.01)
*H04L 1/1607* (2023.01)
(Continued)

(52) U.S. Cl.
CPC ........... *H04W 72/53* (2023.01); *H04L 1/1642* (2013.01); *H04W 56/001* (2013.01);
(Continued)

(58) Field of Classification Search
CPC ...... H04W 28/06; H04W 12/03; H04L 69/04; H04L 69/324; H04L 69/321; H04L 69/22
See application file for complete search history.

(56) References Cited

U.S. PATENT DOCUMENTS 9,386,608 B2 * 7/2016 He ....................... H04W 72/042
10,122,488 B2 * 11/2018 Chung .............. H04W 72/0446
(Continued)

FOREIGN PATENT DOCUMENTS

| CN | 103974424 A | 8/2014 |
|---|---|---|
| CN | 104349458 A | 2/2015 |

(Continued)

OTHER PUBLICATIONS

CMCC; "Discussion on remaining issues for semi-static DL-UL assignment and dynamic SFI", 3GPP Draft; R1-1802041, 3rd Generation Partnership Project (3GPP), Athens ; Greece ; vol. RAN WG1, Meeting #92; Feb. 26, 2018 to Mar. 2, 2018 (Year: 2018).*
(Continued)

*Primary Examiner* — Brian T O Connor
(74) *Attorney, Agent, or Firm* — Price Heneveld LLP

(57) ABSTRACT

A method of determining uplink and downlink transmission configuration, a method of configuring uplink and downlink transmission and devices thereof are provided. The method of determining uplink and downlink transmission configuration applied to a UE includes: determining a correspon-
(Continued)

dence relationship between a start position of uplink and downlink transmission period and a start position of radio frame, based on uplink and downlink transmission configuration parameters configured by a base station, where the uplink and downlink transmission configuration parameters include one set of uplink and downlink transmission configuration parameters or two sets of uplink and downlink transmission configuration parameters, and each set of uplink and downlink transmission configuration parameters includes an uplink and downlink transmission period.

8 Claims, 4 Drawing Sheets

(51) Int. Cl.
  *H04W 56/00* (2009.01)
  *H04W 72/0446* (2023.01)
  *H04W 72/0453* (2023.01)
  *H04W 72/21* (2023.01)
  *H04W 72/23* (2023.01)

(52) U.S. Cl.
  CPC ... *H04W 72/0446* (2013.01); *H04W 72/0453* (2013.01); *H04W 72/21* (2023.01); *H04W 72/23* (2023.01)

(56) References Cited

U.S. PATENT DOCUMENTS

| | | | | |
|---|---|---|---|---|
| 10,476,653 | B2* | 11/2019 | Yang | H04L 1/1812 |
| 10,587,363 | B2* | 3/2020 | Zhou | H04W 76/11 |
| 10,673,605 | B2* | 6/2020 | Kim | H04L 5/0096 |
| 10,951,383 | B2* | 3/2021 | Lu | H04L 5/0094 |
| 11,197,334 | B2* | 12/2021 | Yi | H04W 72/56 |
| 11,284,439 | B2* | 3/2022 | Yi | H04W 24/10 |
| 11,320,511 | B2* | 5/2022 | Tenny | G01S 5/10 |
| 11,375,427 | B2* | 6/2022 | Baek | H04W 36/26 |
| 2013/0336299 | A1 | 12/2013 | Lee et al. | |
| 2015/0003301 | A1* | 1/2015 | He | H04L 5/1469 370/280 |
| 2016/0183231 | A1 | 6/2016 | Shi et al. | |
| 2018/0367289 | A1* | 12/2018 | Kim | H04L 5/0092 |
| 2020/0205156 | A1* | 6/2020 | Adjakple | H04W 72/02 |
| 2021/0014861 | A1* | 1/2021 | Wang | H04L 69/324 |
| 2021/0400509 | A1* | 12/2021 | Lee | H04W 4/40 |

FOREIGN PATENT DOCUMENTS

| | | |
|---|---|---|
| CN | 107371217 A | 11/2017 |
| WO | 2012019348 A1 | 2/2012 |
| WO | 2015115988 A1 | 8/2015 |
| WO | 2017193869 A1 | 11/2017 |

OTHER PUBLICATIONS

Huawei, Hisilicon; "Dynamic and semi-static DL/UL resource partition", 3GPP Draft; R1-1719390, 3rd Generation Partnership Project (3GPP), Reno; USA ; vol. RAN WG1, Meeting #91; Nov. 27, 2017 to Dec. 1, 2017 (Year: 2017).*

Ericsson, "Allocation of subframes to UL and DL", TSG-RAN WG1 L TE TDD Ad Hoc, R1-071890, Beijing, China, Apr. 17-20, 2007.

CMCC, "Discussion on Signalling and UE behavior for DL and UL transmission assignment", 3GPP TSG RAN WGI Meeting 90bis, RI-1717885, Prague, CZ, Oct. 9-13, 2017.

3GPP TSG RAN WG1 Meeting AH 1801; R1-1800131; Vancouver, Canada, Jan. 22-26, 2018, 11 pages.

3GPP TSG RAN WG1 Meeting AH 1801; R1-1800992; Vancouver, Canada, Jan. 22-26, 2018, 13 pages.

* cited by examiner

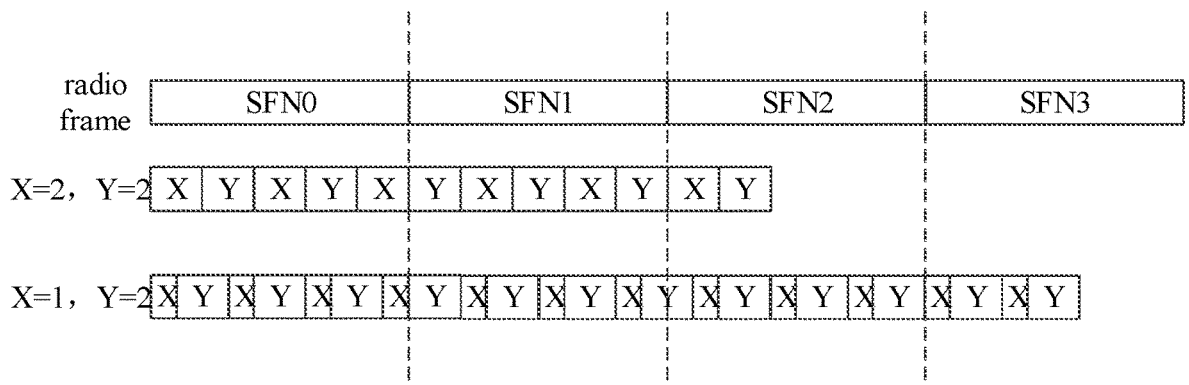
FIG.1
determining a correspondence relationship between a start position of uplink and downlink transmission period and a start position of radio frame, based on uplink and downlink transmission configuration parameters configured by a base station — 21
FIG.2
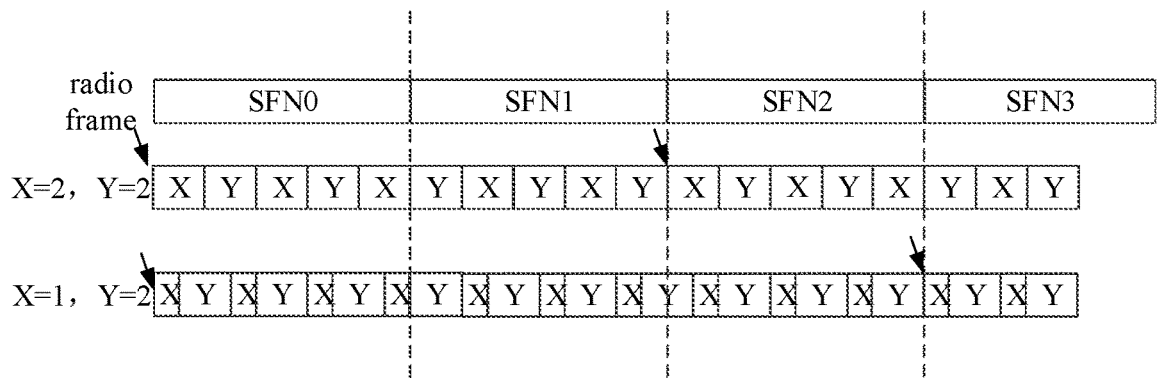
FIG.3

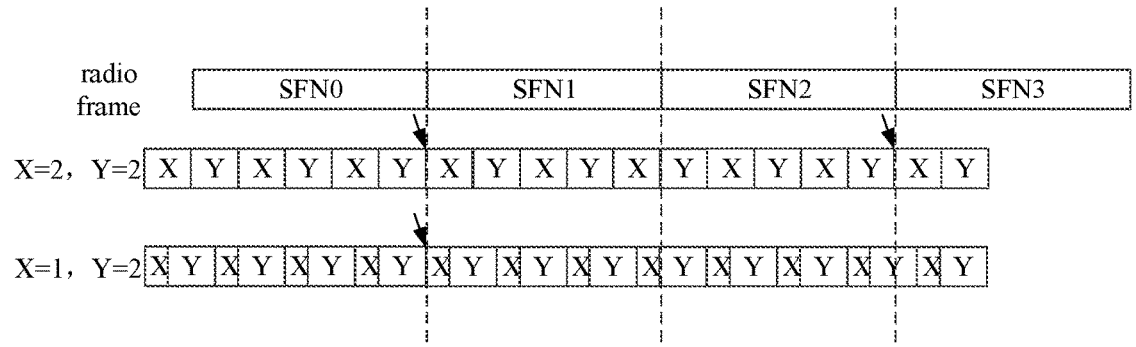

FIG.4

FIG.5 sending a number of an aligned radio frame, in the case that uplink and downlink transmission configuration parameters configured by the base station include one set of uplink and downlink transmission configuration parameters, where a start position of the radio frame corresponding to the number is aligned with a start position of an uplink and downlink transmission period ——51

FIG.6 sending a number of an aligned radio frame, in the case that uplink and downlink transmission configuration parameters include two sets of uplink and downlink transmission configuration parameters, an uplink and downlink transmission period in a first set of uplink and downlink transmission configuration parameters is $X$, an uplink and downlink transmission period in a second set of uplink and downlink transmission configuration parameters is $Y$, and the uplink and downlink transmission periods in the two sets of uplink and downlink transmission configuration parameters constitute a combined period $X+Y$ for transmission, where a start position of the radio frame corresponding to the number is aligned with a start position of a predetermined period in the combined period ——61

FIG.7

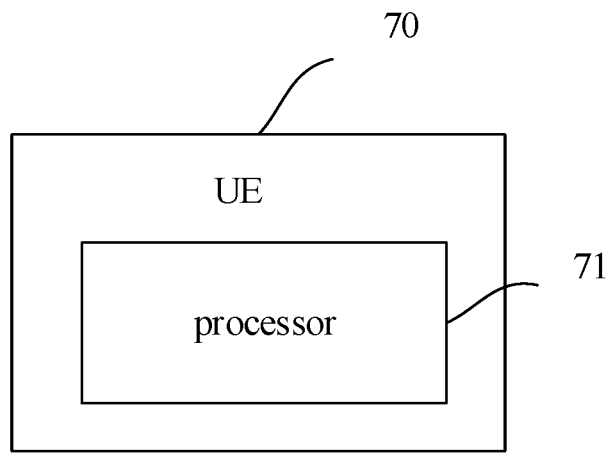

FIG.8

METHOD OF DETERMINING UPLINK AND DOWNLINK TRANSMISSION CONFIGURATION, METHOD OF CONFIGURING UPLINK AND DOWNLINK TRANSMISSION AND DEVICES THEREOF

CROSS REFERENCE OF RELATED APPLICATION

The present application is the U.S. national phase of PCT Application PCT/CN2019/070825 filed on Jan. 8, 2019, which claims a priority of Chinese patent application No. 201810149220.9 filed on Feb. 13, 2018, which is incorporated herein by reference in its entirety.

TECHNICAL FIELD

The present disclosure relates to the field of radio communication technology, in particular to a method of determining uplink and downlink transmission configuration, a method of configuring uplink and downlink transmission and devices thereof.

BACKGROUND

In 5G New Radio (NR), a radio frame has a length of 10 milliseconds (ms) and includes 10 subframes with a length of 1 ms. For the indication of the frame structure, unlike the Long Term Evolution (LTE) system that broadcasts cell-level Time Division Duplexing (TDD) uplink and downlink timeslot ratios through system messages, 5G uses a more flexible frame structure indication signaling including a semi-static uplink and downlink transmission direction configuration and a dynamic uplink and downlink transmission direction configuration.

For the semi-static uplink and downlink transmission direction configuration, the single period indication is used in the related art. 5GNR currently supports 0.5 ms, 0.625 ms, 1 ms, 2 ms, 2.5 ms, 5 ms, 10 ms semi-static uplink and downlink transmission periods (DL-unknown-UL periodicity). In the case of a single period, since the value of a single period can divide the length of the radio frame, the semi-static period may be completely nested in the radio frame of 10 ms, that is, the start position of the radio frame may always be aligned with the start position of the semi-static period.

However, 5G NR may also adopt the semi-static frame structure indication method with the combined period in the future. For example, two periods form a new period of Xms+Yms, where the value range of X and Y comes from {0.5, 0.625, 1, 1.25, 2, 2.5, 5, 10} ms. When the configuration of the combined period is adopted, the length of the combined period may not be able to divide the length of the radio frame, and then the start position of the combined period may not be aligned with the start position of the radio frame.

When the start position of the combined period is not aligned with the start position of the radio frame, how a UE determines the relative position of the combined period to the radio frame is a problem to be solved.

SUMMARY

A method of determining uplink and downlink transmission configuration applied to a UE is provided in the present disclosure, including:

determining a correspondence relationship between a start position of uplink and downlink transmission period and a start position of radio frame, based on uplink and downlink transmission configuration parameters configured by a base station, where the uplink and downlink transmission configuration parameters include one set of uplink and downlink transmission configuration parameters or two sets of uplink and downlink transmission configuration parameters, and each set of uplink and downlink transmission configuration parameters includes an uplink and downlink transmission period.

Optionally, in the case that the uplink and downlink transmission configuration parameters include one set of uplink and downlink transmission configuration parameters, a length of a radio frame is capable of including K complete uplink and downlink transmission periods, where K is a positive integer;

the determining the correspondence relationship between the start position of uplink and downlink transmission period and the start position of radio frame includes:

determining that a start position of a first uplink and downlink transmission period of the K uplink and downlink transmission periods is aligned with a start position of the radio frame.

Optionally, in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, and a length of a radio frame is capable of including A complete combined periods, where A is a positive integer;

the determining the correspondence relationship between the start position of uplink and downlink transmission period and the start position of radio frame includes:

determining that a start position of a first combined period of the A combined periods is aligned with a start position of the radio frame.

Optionally, in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission;

the determining the correspondence relationship between the start position of uplink and downlink transmission period and the start position of radio frame includes:

determining that a number of a radio frame of which a start position is aligned with a start position of a predetermined period in the combined period satisfies SFN mod Nc=M, where SFN is the number of the radio frame, mod is a remainder function, Nc is a ratio of Tc to a length of the radio frame, Tc is a least common multiple of the combined period and the length of the radio frame, and M is a positive integer ranging from 0 to Nc−1.

Optionally, in the case that the uplink and downlink transmission configuration parameters include one set of uplink and downlink transmission configuration parameters, a length of a radio frame is capable of including K complete uplink and downlink transmission periods, where K is a positive integer;

the determining the correspondence relationship between the start position of uplink and downlink transmission period and the start position of radio frame includes:

determining that a number of a radio frame of which a start position is aligned with a start position of the uplink and downlink transmission period satisfies $(N_{slot}^{frame,\mu} \cdot n_f + n_{s,f}^{\mu})$ mod N=0, where $\mu$ is an index of a subcarrier interval, N is a quantity of slots with reference to a subcarrier interval corresponding to $\mu$ in a downlink transmission period, $n_{s,f}^{\mu}$ is a slot number in the radio frame, $N_{slot}^{frame,\mu}$ is a quantity of slots with reference to a subcarrier interval corresponding to $\mu$ in one radio frame, and $n_f$ is a number of the radio frame.

Optionally, in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission;

the determining the correspondence relationship between the start position of uplink and downlink transmission period and the start position of radio frame includes:

determining that a number of a radio frame of which a start position is aligned with a start position of a first uplink and downlink transmission period X in the combined period satisfies $(N_{slot}^{frame,\mu} \cdot n_f + n_{s,f}^{\mu}) \mod (N_X = N_Y) = 0$, where $\mu$ is an index of a subcarrier interval, $N_X$ is a quantity of slots with reference to a subcarrier interval corresponding to $\mu$ in the uplink and downlink transmission period X, $N_Y$ is a quantity of slots with reference to a subcarrier interval corresponding to $\mu$ in the uplink and downlink transmission period Y, $n_{s,f}^{\mu}$ is a slot number in the radio frame, $N_{slot}^{frame,\mu}$ is a quantity of slots with reference to a subcarrier interval corresponding to $\mu$ in one radio frame, and $n_f$ is a number of the radio frame; and/or determining that a number of a radio frame of which a start position is aligned with a start position of a second uplink and downlink transmission period Y in the combined period satisfies $(N_{slot}^{frame,\mu} \cdot n_f + n_{s,f}^{\mu}) \mod (N_X = N_Y) = N_X$.

Optionally, in the case that the uplink and downlink transmission configuration parameters include one set of uplink and downlink transmission configuration parameters, the determining the correspondence relationship between the start position of uplink and downlink transmission period and the start position of radio frame includes:

acquiring a number of a predefined and aligned radio frame, where a start position of the radio frame corresponding to the number is aligned with a start position of the uplink and downlink transmission period.

Optionally, in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission;

the determining the correspondence relationship between the start position of uplink and downlink transmission period and the start position of radio frame includes:

acquiring a number of a predefined and aligned radio frame, where a start position of the radio frame corresponding to the number is aligned with a start position of a predetermined period in the combined period.

Optionally, in the case that the uplink and downlink transmission configuration parameters include one set of uplink and downlink transmission configuration parameters, the determining the correspondence relationship between the start position of uplink and downlink transmission period and the start position of radio frame includes:

receiving a number of an aligned radio frame sent by the base station, where a start position of the radio frame corresponding to the number is aligned with a start position of the uplink and downlink transmission period.

Optionally, in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission;

the determining the correspondence relationship between the start position of uplink and downlink transmission period and the start position of radio frame includes:

receiving a number of an aligned radio frame sent by the base station, where a start position of the radio frame corresponding to the number is aligned with a start position of a predetermined period in the combined period.

Optionally, the predetermined period in the combined period is the uplink and downlink transmission period corresponding to the first set of uplink and downlink transmission configuration parameters of the two sets of uplink and downlink transmission configuration parameters, or the predetermined period in the combined period is the uplink and downlink transmission period corresponding to the second set of uplink and downlink transmission configuration parameters of the two sets of uplink and downlink transmission configuration parameters.

Optionally, in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission;

the determining the correspondence relationship between the start position of uplink and downlink transmission period and the start position of radio frame includes:

determining that a start position of a first radio frame at a time interval T is the same as a start position of a predetermined period in the combined period.

Optionally, the time interval T is predefined, or the time interval T is configured by the base station, or the time interval T is determined based on a period of a synchronization signal block.

A method of configuring uplink and downlink transmission applied to a base station is further provided in the present disclosure, including:

sending a number of an aligned radio frame, in the case that uplink and downlink transmission configuration parameters configured by the base station include one set of uplink and downlink transmission configuration parameters, where a start position of the radio frame corresponding to the number is aligned with a start position of an uplink and downlink transmission period.

A method of configuring uplink and downlink transmission applied to a base station is further provided in the present disclosure, including:

sending a number of an aligned radio frame, in the case that uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, where a start position of the radio frame corresponding to the number is aligned with a start position of a predetermined period in the combined period.

A UE is further provided in the present disclosure, including:

a processor, configured to determine a correspondence relationship between a start position of uplink and downlink transmission period and a start position of radio frame, based on uplink and downlink transmission configuration parameters configured by a base station, where the uplink and downlink transmission configuration parameters include one set of uplink and downlink transmission configuration parameters or two sets of uplink and downlink transmission configuration parameters, and each set of uplink and downlink transmission configuration parameters includes an uplink and downlink transmission period.

Optionally, the processor is further configured to:

in the case that the uplink and downlink transmission configuration parameters include one set of uplink and downlink transmission configuration parameters, a length of a radio frame is capable of including K complete uplink and downlink transmission periods, determine that a start position of a first uplink and downlink transmission period of the K uplink and downlink transmission periods is aligned with a start position of the radio frame, where K is a positive integer.

Optionally, the processor is further configured to:

in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, and a length of a radio frame is capable of including A complete combined periods, determine that a start position of a first combined period of the A combined periods is aligned with a start position of the radio frame, where A is a positive integer.

Optionally, the processor is further configured to:

in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, determine that a number of a radio frame of which a start position is aligned with a start position of a predetermined period in the combined period satisfies SFN mod Nc=M, where SFN is the number of the radio frame, mod is a remainder function, Nc is a ratio of Tc to a length of the radio frame, Tc is a least common multiple of the combined period and the length of the radio frame, and M is a positive integer ranging from 0 to Nc−1.

Optionally, the processor is further configured to:

in the case that the uplink and downlink transmission configuration parameters include one set of uplink and downlink transmission configuration parameters, a length of a radio frame is capable of including K complete uplink and downlink transmission periods, determine that a number of a radio frame of which a start position is aligned with a start position of the uplink and downlink transmission period satisfies $N_{slot}^{frame,\mu} \cdot n_f + n_{s,f}^{\mu}) \mod N = 0$, where $\mu$ is an index of a subcarrier interval, N is a quantity of slots with reference to a subcarrier interval corresponding to $\mu$ in a downlink transmission period, $n_{s,f}^{\mu}$ is a slot number in the radio frame, $N_{slot}^{frame,\mu}$ is a quantity of slots with reference to a subcarrier interval corresponding to $\mu$ in one radio frame, and $n_f$ is a number of the radio frame, where K is a positive integer.

Optionally, the processor is further configured to:

in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, determine that a number of a radio frame of which a start position is aligned with a start position of a first uplink and downlink transmission period X in the combined period satisfies $(N_{slot}^{frame,\mu} \cdot n_f + n_{s,f}^{\mu}) \mod (N_X = N_Y) = 0$, where $\mu$ is an index of a subcarrier interval, $N_X$ is a quantity of slots with reference to a subcarrier interval corresponding to $\mu$ in the uplink and downlink transmission period X, $N_Y$ is a quantity of slots with reference to a subcarrier interval corresponding to $\mu$ in the uplink and downlink transmission period Y, $n_{s,f}^{\mu}$ is a slot number in the radio frame, $N_{slot}^{frame,\mu}$ is a quantity of slots with reference to a subcarrier interval corresponding to $\mu$ in one radio frame, and $n_f$ is a number of the radio frame;

and/or determine that a number of a radio frame of which a start position is aligned with a start position of a second uplink and downlink transmission period Y in the combined period satisfies $(N_{slot}^{frame,\mu} \cdot n_f + n_{s,f}^{\mu}) \mod (N_X = N_Y) = N_X$.

Optionally, the processor is further configured to: in the case that the uplink and downlink transmission configuration parameters include one set of uplink and downlink transmission configuration parameters, acquire a number of a predefined and aligned radio frame, where a start position of the radio frame corresponding to the number is aligned with a start position of the uplink and downlink transmission period.

Optionally, the processor is further configured to:

in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, acquire a number of a predefined and aligned radio frame, where a start position of the radio frame corresponding to the number is aligned with a start position of a predetermined period in the combined period.

Optionally, the UE further includes a transceiver configured to: in the case that the uplink and downlink transmission configuration parameters include one set of uplink and downlink transmission configuration parameters, receive a number of an aligned radio frame sent by the base station, where a start position of the radio frame corresponding to the number is aligned with a start position of the uplink and downlink transmission period.

Optionally, the UE further includes a transceiver configured to: in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, receive a number of an aligned radio frame sent by the base station, where a start position of the radio frame corresponding to the number is aligned with a start position of a predetermined period in the combined period.

Optionally, the predetermined period in the combined period is the uplink and downlink transmission period corresponding to the first set of uplink and downlink transmission configuration parameters of the two sets of uplink and downlink transmission configuration parameters, or the predetermined period in the combined period is the uplink and downlink transmission period corresponding to the second set of uplink and downlink transmission configuration parameters of the two sets of uplink and downlink transmission configuration parameters.

Optionally, the processor is further configured to: in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, determine that a start position of a first radio frame at a time interval T is the same as a start position of a predetermined period in the combined period.

Optionally, the time interval T is predefined, or the time interval T is configured by the base station, or the time interval T is determined based on a period of a synchronization signal block.

A base station is further provided in the present disclosure, including a transceiver configured to send a number of an aligned radio frame, in the case that uplink and downlink transmission configuration parameters configured by the base station include one set of uplink and downlink transmission configuration parameters, where a start position of the radio frame corresponding to the number is aligned with a start position of an uplink and downlink transmission period.

A base station is further provided in the present disclosure, including a transceiver configured to send a number of an aligned radio frame, in the case that uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, where a start position of the radio frame corresponding to the number is aligned with a start position of a predetermined period in the combined period.

A UE is further provided in the present disclosure, including a memory, a processor and a computer program stored in the memory and executable on the processor, where the processor executes the computer program to perform the method of determining uplink and downlink transmission configuration hereinabove.

A base station is further provided in the present disclosure, including a memory, a processor and a computer program stored in the memory and executable on the processor, where the processor executes the computer program to perform the method of configuring uplink and downlink transmission hereinabove.

A computer-readable storage medium is further provided in the present disclosure, where a computer program is stored in the computer-readable storage medium, and a processor executes the computer program to perform the method of determining uplink and downlink transmission configuration hereinabove, or the processor executes the computer program to perform the method of configuring uplink and downlink transmission hereinabove.

BRIEF DESCRIPTION OF THE DRAWINGS

In order to explain the technical solutions of the embodiments of the present disclosure more clearly, the drawings that need to be used in the description of the embodiments of the present disclosure will be introduced briefly below. Obviously, the drawings in the following description are only some embodiments of the present disclosure. For those of ordinary skill in the art, other drawings may be obtained based on these drawings without creative work.

FIG. 1 is a schematic view of a positional relationship between a start position of a combined period and a start position of a radio frame in an embodiment of the present disclosure;

FIG. 2 is a schematic flowchart of a method of determining uplink and downlink transmission configuration in Embodiment 1 of the present disclosure;

FIG. 3 is a schematic view of an alignment of a start position of a combined period and a start position of a radio frame in an embodiment of the present disclosure;

FIG. 4 is a schematic view of an alignment of a start position of a combined period and a start position of a radio frame in another embodiment of the present disclosure;

FIG. 5 is a schematic view of an alignment of a start position of a combined period and a start position of a radio frame in another embodiment of the present disclosure;

FIG. 6 is a schematic flowchart of a method of configuring uplink and downlink transmission in an embodiment of the present disclosure;

FIG. 7 is a schematic flowchart of a method of configuring uplink and downlink transmission in another embodiment of the present disclosure;

FIG. 8 is a schematic structural view of a UE in an embodiment of the present disclosure;

DETAILED DESCRIPTION

Figure 9:
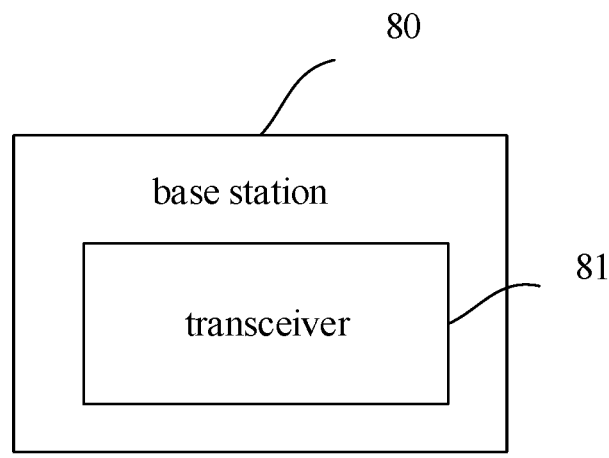
FIG. 9 is a schematic structural view of a base station in an embodiment of the present disclosure.
Figure 10:
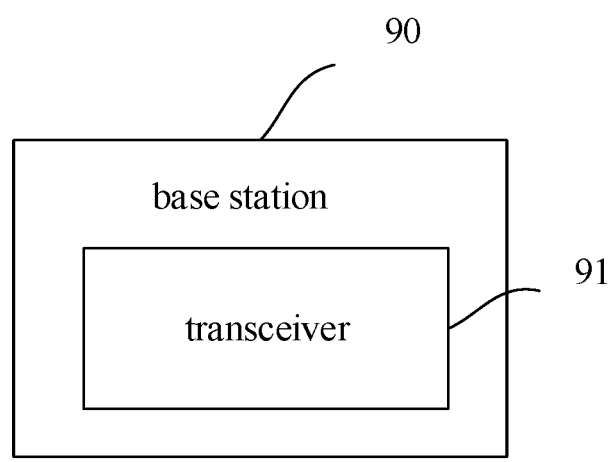
FIG. 10 is a schematic structural view of a base station in another embodiment of the present disclosure.

To make the objectives, technical solutions, and advantages of the embodiments of the present disclosure clearer, the technical solutions of the embodiments of the present disclosure will be described clearly and completely in conjunction with the accompanying drawings of the embodiments of the present disclosure. Obviously, the described embodiments are part of the embodiments of the present disclosure, rather than all of the embodiments. Based on the described embodiments of the present disclosure, all other embodiments obtained by a person of ordinary skill in the art fall within the protection scope of the present disclosure.

Firstly, the definition of the combined period will be explained.

The combined period means that, when the uplink and downlink transmission configuration parameters configured by the base station include two sets of uplink and downlink transmission configuration parameters, the uplink and downlink transmission period included in one set of uplink and downlink transmission configuration parameters is X, and the uplink and downlink transmission period included in the other set of uplink and downlink transmission configuration parameters is Y, and the uplink and downlink transmission periods in the two sets of uplink and downlink transmission configuration parameters constitute a combined period X+Y for transmission. The value range of X and Y may come from {0.5, 0.625, 1, 1.25, 2, 2.5, 5, 10} ms. For example, assuming that X is 1 ms and Y is 2 ms, the length of the combined period is 3 ms.

The base station may configure the uplink and downlink transmission configuration parameters through a high-level signaling Radio Resource Control (RRC) or Media Access Control (MAC) signaling or system messages. The uplink and downlink transmission configuration parameters include uplink and downlink transmission periods. The uplink and downlink transmission configuration parameters may include one set of uplink and downlink transmission configuration parameters or two sets of uplink and downlink transmission configuration parameters. When the uplink and downlink transmission configuration parameters include one set of uplink and downlink transmission configuration parameters, the uplink and downlink transmission period is a single period. When the uplink and downlink transmission configuration parameters include two sets of uplink and downlink transmission configuration parameters, the uplink and downlink transmission period is a combined period.

For example, a tdd-UL-DL-configurationCommon message is configured through a high-level signaling RRC or MAC signaling or system messages, that is, the uplink and downlink transmission configuration parameters include period information X, slots in the period and a transmission direction configuration of symbols. In addition, another set of tdd-UL-DL-configurationCommon parameters are additionally configured, or another set of period information Y, slots in the period and a transmission direction configuration of symbols are additionally configured in the tdd-UL-DL-configurationCommon message. The two sets of periods, which may be the same or different, form an equivalent X+Y transmission period, which is called a combined period. In addition to tdd-UL-DL-configurationDedicated parameters, the uplink and downlink transmission configuration parameters may further tdd-UL-DL-configurationCommon parameters.

Referring to FIG. 1, which is a schematic view of a positional relationship between a start position of a combined period and a start position of a radio frame in an embodiment of the present disclosure. As shown in FIG. 1, when X=1 and Y=2 in the combined period (X+Y), the start position of the radio frame SFN2 is not the start position of the X period, but a middle position of the Y period.

When the start position of the combined period is not aligned with the start position of the radio frame, how the UE determines the relative position of the combined period to the radio frame is a problem to be solved.

At the same time, in the 5G system, when the uplink and downlink transmission configuration parameters configured for the base station include one set of uplink and downlink transmission configuration parameters, that is, when the uplink and downlink transmission configuration parameters are indicated in a single period, a correspondence relationship between a start position of uplink and downlink transmission period and a start position of radio frame is not clearly defined.

In order to solve the above issues, a method of determining uplink and downlink transmission configuration, a method of configuring uplink and downlink transmission and devices thereof are provided in the embodiments of the present disclosure. A UE determines a correspondence relationship between a start position of uplink and downlink transmission period and a start position of radio frame based on uplink and downlink transmission configuration parameters configured by a base station, so the UE may accurately obtain an uplink and downlink transmission direction in an uplink and downlink transmission period based on the determined correspondence relationship between the start position of uplink and downlink transmission period and the start position of radio frame, thereby avoiding the UE and the base station from understanding the uplink and downlink transmission direction inconsistently.

The method of determining uplink and downlink transmission configuration, the method of configuring uplink and downlink transmission and the devices thereof in the embodiments of the present disclosure may be applied to a 5G NR system, and of course, may also be applied to other communication systems in the future.

To facilitate understanding, a semi-static frame structure used to indicate the uplink and downlink transmission directions in the 5G NR system is briefly described below.

In the 5G NR system, there are two levels of transmission direction configuration in each uplink and downlink transmission period, one is a cell-dedicated uplink and downlink configuration, and the other is a User Equipment (UE)-dedicated uplink and downlink configuration.

Cell-Dedicated Uplink and Downlink Configuration:

The indication of the cell-dedicated uplink and downlink configuration, and the indication of the transmission direction in a period adopts the DL-unknown-UL format.

For a DL resource indication, the indication signaling includes a quantity of full downlink slots x1 from a start position of the uplink and downlink transmission period, and x1 may range from 0 to a quantity of slots in the uplink and downlink transmission period. The indication signaling further includes a quantity of downlink symbols x2 in a partial downlink slot immediately following the full downlink slot, where x2 ranges from 0 to 13.

For a UL resource indication, the indication signaling includes y1 full uplink slots up to an end position of the above uplink and downlink transmission period, and y1 may range from 0 to the quantity of slots in the uplink and downlink transmission period. The indication signaling further includes an uplink symbol quantity indication y2 in a partial uplink slot prior to the full uplink slot, where y2 ranges from 0 to 13.

Resources between DL and UL are unknown resources.

UE-dedicated uplink and downlink configuration:

The UE-dedicated semi-static uplink and downlink signaling configuration indicates unknown resources based on a slot-by-slot indication manner. The indication signaling includes:

A quantity y3 of downlink symbols: representing a quantity of downlink symbols from a start position in the slot of number x3, where x3 ranges from 1 to a quantity of slots in the uplink and downlink transmission period, and a range of y3 is {0, 1, . . . , 13, 14}.

A quantity y4 of uplink symbols: representing a quantity of uplink symbols up to an end position in the slot of number x4, where x4 ranges from 1 to a quantity of slots in the uplink and downlink transmission period, and a range of y4 is {0, 1, . . . , 13, 14}.

When the UE performs a cell initial access in a certain radio frame and then obtains the semi-static uplink and downlink transmission direction configuration, the UE needs to determine the uplink and downlink transmission direction in each slot in the period according to the above {x1, y1, x2, y2} in the semi-static configuration.

In the embodiment of the present disclosure, the UE determines the correspondence relationship between the start position of the uplink and downlink transmission period and the start position of the radio frame, and determines the uplink and downlink transmission direction in the uplink and downlink transmission period, so as to determine the uplink and downlink transmission direction in each slot in the period according to the above {x1, y1, x2, y2} in the semi-static configuration.

Referring to FIG. 2, which is a schematic flowchart of a method of determining uplink and downlink transmission configuration in Embodiment 1 of the present disclosure. The method is applied to a UE and includes the following steps:

Step 21: determining a correspondence relationship between a start position of uplink and downlink transmission period and a start position of radio frame, based on uplink and downlink transmission configuration parameters configured by a base station, where the uplink and downlink transmission configuration parameters include one set of uplink and downlink transmission configuration parameters or two sets of uplink and downlink transmission configuration parameters, and each set of uplink and downlink transmission configuration parameters includes an uplink and downlink transmission period.

According to the embodiments of the present disclosure, a UE determines a correspondence relationship between a start position of uplink and downlink transmission period and a start position of radio frame based on uplink and downlink transmission configuration parameters configured by a base station, so the UE may accurately obtain an uplink and downlink transmission direction in an uplink and downlink transmission period based on the determined correspondence relationship between the start position of uplink and downlink transmission period and the start position of radio frame, thereby avoiding the UE and the base station from understanding the uplink and downlink transmission direction inconsistently.

In the embodiment of the present disclosure, the correspondence relationship between the start position of the uplink and downlink transmission period and the start position of the radio frame may be determined in a variety of ways, which will be described with an example below.

The determination of the correspondence relationship between the start position of the uplink and downlink transmission period and the start position of the radio frame may be performed through two manner, one is based on the rules predefined by the protocol, and the other is based on the information configured by the base station, details thereof will be described below.

Firstly, the determination of the correspondence relationship between the start position of the uplink and downlink transmission period and the start position of the radio frame based on the rules predefined by the protocol will be described.

In some embodiments of the present disclosure, when the uplink and downlink transmission configuration parameters include one set of uplink and downlink transmission configuration parameters, the length of the radio frame can include K complete uplink and downlink transmission periods, where K is a positive integer, At this time, the step of determining the correspondence relationship between the start position of the uplink and downlink transmission period and the start position of the radio frame includes: determining that a start position of a first uplink and downlink transmission period of the K uplink and downlink transmission periods is aligned with a start position of the radio frame.

In some embodiments of the present disclosure, when the uplink and downlink transmission configuration parameters include one set of uplink and downlink transmission configuration parameters, the length of the radio frame can include K complete uplink and downlink transmission periods, where K is a positive integer. At this time, the step of determining the correspondence relationship between the start position of the uplink and downlink transmission period and the start position of the radio frame includes: determining a start position of an uplink and downlink transmission period at an interval of K uplink and downlink transmission periods is aligned with a start position of a radio frame.

In some embodiments of the present disclosure, in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, and a length of a radio frame is capable of including A complete combined periods, where A is a positive integer; the determining the correspondence relationship between the start position of uplink and downlink transmission period and the start position of radio frame includes: determining that a start position of a first combined period of the A combined periods is aligned with a start position of the radio frame.

In some embodiments of the present disclosure, in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, and a length of a radio frame is capable of including A complete combined periods, where A is a positive integer; the determining the correspondence relationship between the start position of uplink and downlink transmission period and the start position of radio frame includes: determining that a start position of a first combined period at an interval of A combined periods is aligned with a start position of the radio frame.

In some embodiments of the present disclosure, in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission; the determining the correspondence relationship between the start position of uplink and downlink transmission period and the start position of radio frame includes: determining that a number of a radio frame of which a start position is aligned with a start position of a predetermined period in the combined period satisfies SFN mod Nc=M, where SFN is the number of the radio frame, mod is a remainder function, Nc is a ratio of Tc to a length of the radio frame, Tc is a least common multiple of the combined period and the length of the radio frame, and M is a positive integer ranging from 0 to Nc−1.

Hereinafter, taking the combined period including two single periods (X and Y) as an example, the method of determining a number of a radio frame of which a start position is aligned with a start position of a predetermined period in the combined period will be described.

When determining the number of the radio frame of which the start position is aligned with the start position of the predetermined period in the combined period, a least common multiple Tc of the length of the combined period (X+Y) and the length of the radio frame may be determined first, where the unit of Tc is ms. For example, when X=1 ms and Y=2 ms, the length of the combined period (X+Y) is 3 ms, and the least common multiple of the length of the combined period (3 ms) and the length of the radio frame (10 ms) is 30 ms.

Then, a ratio Nc of the least common multiple Tc to the length of the radio frame is calculated. Still taking the above example for description, Tc is 30 ms, and Nc is Tc/10=3. The ratio Nc represents the quantity of radio frames contained in Tc. At the same time, it also represents the period in the combined periods of which the start position is aligned with the start position of the radio frame, that is, at an interval of Nc radio frames, the relative position of the start position of the combined period and the start position of the radio frame are the same.

Then, according to the M value predefined by the protocol, the number of the radio frame that satisfies SFN mod Nc=M is determined, where the value of M ranges from 0 to (Nc−1).

Referring to FIG. 3 which shows the case where M takes a value of 0, when X=2 and Y=2 in the combined period, Nc=2, and the numbers of radio frames satisfying SFN mod Nc=0 are 0, 2, 4, . . . that is, the start positions of the radio frames whose numbers are 0, 2, 4, . . . are aligned with the start position of the X period in the combined period. When X=1 and Y=2 in the combined period, Nc=3, and the numbers of radio frames satisfying SFN mod Nc=0 are 0, 3, 6, . . . , that is, the start positions of the radio frames whose numbers are 0, 3, 6 . . . are aligned with the start position of the X period in the combined period.

Referring to FIG. 4 which shows the case where M takes a value of 1, when X=2 and Y=2 in the combined period, Nc=2, and the numbers of radio frames satisfying SFN mod Nc=1 are 1, 3, 5, . . . , that is, the start positions of the radio frames whose numbers are 1, 3, 5, . . . are aligned with the start position of the X period in the combined period. When X=1 and Y=2 in the combined period, Nc=3, and the numbers of radio frames satisfying SFN mod Nc=1 are 1, 4, 7, . . . , that is, the start positions of the radio frames whose numbers are 1, 4, 7, . . . are aligned with the start position of the X period in the combined period.

In the above embodiment, the start position of the X period being aligned with the start position of the radio frame are taken as an example for description. Of course, the start position of the Y period may also be aligned with the start position of the radio frame.

In some embodiments of the present disclosure, in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission; the determining the correspondence relationship between the start position of uplink and downlink transmission period and the start position of radio frame includes:

determining that a number of a radio frame of which a start position is aligned with a start position of a first uplink and downlink transmission period X in the combined period satisfies $(N_{slot}^{frame,\mu} \cdot n_f + n_{s,f}^{\mu}) \bmod (N_X = N_Y) = 0$, where $\mu$ is an index of a subcarrier interval, $N_X$ is a quantity of slots with reference to a subcarrier interval corresponding to μ in the uplink and downlink transmission period X, $N_Y$ is a quantity of slots with reference to a subcarrier interval corresponding to μ in the uplink and downlink transmission period Y, $n_{s,f}^\mu$ is a slot number in the radio frame, $N_{slot}^{frame,\mu}$ is a quantity of slots with reference to a subcarrier interval corresponding to μ in one radio frame, and $n_f$ is a number of the radio frame; and/or determining that a number of a radio frame of which a start position is aligned with a start position of a second uplink and downlink transmission period Y in the combined period satisfies slot $(N_{slot}^{frame,\mu} \cdot n_f + n_{s,f}^\mu) \mod (N_X = N_Y) = N_X$.

As shown in FIG. 5, NX is 5, NY is 2, $N_{slot}^{frame,\mu}$ is 10, μ is the subcarrier spacing of 15 KHz at this time, and $n_f$ corresponds to the number of SFN in FIG. 5. It can be seen that for SFN 0, $n_{s,f}^\mu$ is 0 (the corresponding calculation is (0*10+0) mod 7=0), for SFN 1, $n_{s,f}^\mu$ is 4 (the corresponding calculation is (1*10+4) mod 7=0), for SFN 2, $n_{s,f}^\mu$ is 1, 8, . . . the corresponding slot position of the above $n_{s,f}^\mu$ is the start slot position of the first uplink and downlink transmission period X, which is a reference start position of the slot when determining the transmission direction in each slot and/or symbol in the uplink and downlink transmission period based on the first set of uplink and downlink transmission configuration parameters.

The first set of uplink and downlink transmission configuration parameters may include cell-common configuration or user-dedicated configuration. For example, two downlink slots, one uplink slot and two unknown slots in the middle are configured for the uplink and downlink transmission period X. When determining the two downlink slots, the start position of the first downlink slot is the above-mentioned slot position.

Similarly, the starting slot position of the uplink and downlink period Y may also be obtained.

In some embodiments of the present disclosure, in the case that the uplink and downlink transmission configuration parameters include one set of uplink and downlink transmission configuration parameters, a length of a radio frame is capable of including K complete uplink and downlink transmission periods, where K is a positive integer; the determining the correspondence relationship between the start position of uplink and downlink transmission period and the start position of radio frame includes: determining that a number of a radio frame of which a start position is aligned with a start position of the uplink and downlink transmission period satisfies $(N_{slot}^{frame,\mu} \cdot n_f + n_{s,f}^\mu) \mod N = 0$, where μ is an index of a subcarrier interval, N is a quantity of slots with reference to a subcarrier interval corresponding to μ in a downlink transmission period, $n_{s,f}^\mu$ is a slot number in the radio frame, $N_{slot}^{frame,\mu}$ is a quantity of slots with reference to a subcarrier interval corresponding to μ in one radio frame, and $n_f$ is a number of the radio frame.

In some embodiments of the present disclosure, in the case that the uplink and downlink transmission configuration parameters include one set of uplink and downlink transmission configuration parameters, the determining the correspondence relationship between the start position of uplink and downlink transmission period and the start position of radio frame includes: acquiring a number of a predefined and aligned radio frame, where a start position of the radio frame corresponding to the number is aligned with a start position of the uplink and downlink transmission period.

In some embodiments of the present disclosure, in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission; the determining the correspondence relationship between the start position of uplink and downlink transmission period and the start position of radio frame includes: acquiring a number of a predefined and aligned radio frame, where a start position of the radio frame corresponding to the number is aligned with a start position of a predetermined period in the combined period.

Optionally, the number of the predefined radio frame of which the start position is aligned with the start position of the predetermined period in the combined period is 0.

In the embodiment of the present disclosure, a number of a radio frame of which the start position is aligned with the start position of the predetermined period in the combined period is directly defined by the protocol, and the UE may determine, based on the number of this radio frame, other radio frames of which the start positions are aligned with start position of the predetermined period in the combined period, so the determination manner is simple manner and does not need to be configured by the base station, thereby saving the signaling overhead.

The determination of correspondence relationship between a start position of uplink and downlink transmission period and a start position of radio frame, based on uplink and downlink transmission configuration parameters configured by a base station will be described below.

In some embodiments of the present disclosure, in the case that the uplink and downlink transmission configuration parameters include one set of uplink and downlink transmission configuration parameters, the determining the correspondence relationship between the start position of uplink and downlink transmission period and the start position of radio frame includes: receiving a number of an aligned radio frame sent by the base station, where a start position of the radio frame corresponding to the number is aligned with a start position of the uplink and downlink transmission period.

Optionally, the number of the radio frame of which the start position is aligned with the start position of the uplink and downlink transmission period sent by the base station is 0.

In the embodiment of the present disclosure, the base station may send the number of the radio frame of which the start position is aligned with the start position of the uplink and downlink transmission period through a high-level signaling, such as minimum system message (RMSI), OSI and other information.

In some embodiments of the present disclosure, in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission; the determining the correspondence relationship between the start position of uplink and downlink transmission period and the start position of radio frame includes: receiving a number of an aligned radio frame sent by the base station, where a start position of the radio frame corresponding to the number is aligned with a start position of a predetermined period in the combined period.

Optionally, the number of the radio frame of which the start position is aligned with the start position of the predetermined period in the combined period sent by the base station is 0.

In the embodiment of the present disclosure, the base station may send the number of the radio frame of which the start position is aligned with the start position of the predetermined period in the combined period through a high-level signaling, such as minimum system message (RMSI), OSI and other information.

In the embodiment of the present disclosure, the base station directly configures a number of a radio frame of which a start position is aligned with the start position of the predetermined period in the combined period, and the UE may determine, based on the number of this radio frame, other radio frames of which the start positions are aligned with start position of the predetermined period in the combined period. Here, the periodicity of the combined period is considered, so there are a plurality of radio frames of which the start positions are aligned with the start position of the predetermined period in the combined period, so the determination is simple. At the same time, due to the number of the aligned radio frame is configured by the base station, different radio frame numbers may be configured according to different requirements, therefore the configuration method is flexible.

The method in the embodiment of the present disclosure may further include:

When the user's uplink and downlink transmission configuration parameters change, the radio frame of which the start position is aligned with the start position of the predetermined period in the combined period will change, and at this time, it is necessary to obtain number of the radio frame of which the start position is aligned with the start position of the predetermined period in the combined period.

According to the number of the aligned radio frame, a distribution of the combined period in each radio frame where the configuration of the combined period is enabled, and the combined period is enabled in the radio frame receiving the configuration information of the combined period, or enabled in a first radio frame of which a start position is aligned with the start position of the predetermined period in the combined period.

The method in the embodiment of the present disclosure may further include: receiving the configuration information of the combined period sent by the base station. The base station may send the configuration information of the combined period through a high-layer signaling.

Since the configuration information of the combined period may also be sent by the base station through a high-level signaling, the configured high-level signaling has its own transmission period, that is, the radio frame where the combined period configuration is enabled is not an aligned radio frame. For example, in the above FIG. 4, the configuration information of the combined period is received in the radio frame SFN0, and the configuration parameters is enabled in SFN0 or a radio frame following SFN0. Here, it is assumed that it is enabled in SFN0. For FIG. 4, the combined period is assumed to be X=2, Y=2, which is reconfigured to X=1, Y=2, then the aligned radio frame of the new combined period is SFN1, so the UE may infer the distribution of X and Y periods in SFN0 based on the alignment in SFN1, and thus determine the DL, unknown and UL resources for each slot.

In the foregoing embodiments, the combined period includes two single periods, the predetermined period is any one of the two single periods. That is, the predetermined period in the combined period is the uplink and downlink transmission period corresponding to the first set of uplink and downlink transmission configuration parameters of the two sets of uplink and downlink transmission configuration parameters, or the predetermined period in the combined period is the uplink and downlink transmission period corresponding to the second set of uplink and downlink transmission configuration parameters of the two sets of uplink and downlink transmission configuration parameters.

In some embodiments of the present disclosure, it may be defined that a start position of a first radio frame at a time interval T is the same as a start position of a predetermined period in the combined period, where T may be predefined or configured by the base station, or T may be obtained according to the period of other periodic signals such as Synchronization Signal Block (SSB). For example, the period of the currently configured SSB is 20 ms, and the start position of the first radio frame every 20 ms is the same as the start position of the predetermined period.

It should be noted that, in the embodiment of the present disclosure, the start position of the radio frame being aligned with the start position of the predetermined period in the combined period does not mean that the predetermined period of each combined period must be aligned with the start position of the radio frame. Because the length of the combined period is not the same as the length of the radio frame, there must be some predetermined periods in the combined period which are in the middle of the radio frame. For the number of aligned radio frames sent by the base station or pre-defined, there will be only one predetermined period which is aligned with the radio frame corresponding to the number, and the subsequent combined period sequence appears, the predetermined period will be aligned with the radio frame every Nc radio frame combined periods. When the number of the radio frame reaches the maximum value and resets to zero, this alignment will be repeated.

In the above embodiment, in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission.

Of course, in some embodiments of the present disclosure, there may be other combination manners for the combined period. For example, in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period for transmission. The combined period includes more than two uplink and downlink transmission periods, for example: X+X+Y, X+Y+X, etc.

Alternatively, in some embodiments of the present disclosure, in the case that the uplink and downlink transmission configuration parameters include more than two sets of uplink and downlink transmission configuration parameters, the uplink and downlink transmission periods in the more than two sets of uplink and downlink transmission configuration parameters constitutes a combined period for transmission, and the combined period includes more than two uplink and downlink transmission periods. For example, in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, an uplink and downlink transmission period in a third set of uplink and downlink transmission configuration parameters is Z, and the uplink and downlink transmission periods in the three sets of uplink and downlink transmission configuration parameters constitute a combined period X+Y+Z for transmission.

Referring to FIG. 5, a method of configuring uplink and downlink transmission applied to a base station is further provided in an embodiment of the present disclosure, including:

Step 51: sending a number of an aligned radio frame, in the case that uplink and downlink transmission configuration parameters configured by the base station include one set of uplink and downlink transmission configuration parameters, where a start position of the radio frame corresponding to the number is aligned with a start position of an uplink and downlink transmission period.

Generally, the aligned radio frame sent by the base station is the first radio frame of which the start position is aligned with the start position of the uplink and downlink transmission period.

In the embodiment of the present disclosure, the base station directly configures a number of a first radio frame of which a start position is aligned with the start position of the uplink and downlink transmission period, and the UE may determine, based on the number of the first radio frame, other radio frames of which the start positions are aligned with start position of the uplink and downlink transmission period, so the determination is simple. At the same time, due to the number of the first radio frame is configured by the base station, different radio frame numbers may be configured according to different requirements, therefore the configuration method is flexible.

Referring to FIG. 6, a method of configuring uplink and downlink transmission applied to a base station is further provided in an embodiment of the present disclosure, including:

Step 61: sending a number of an aligned radio frame, in the case that uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, where a start position of the radio frame corresponding to the number is aligned with a start position of a predetermined period in the combined period.

Generally, the aligned radio frame sent by the base station is the first radio frame aligned of which the start position is aligned with the start position of the predetermined period in the combined period.

In the embodiment of the present disclosure, the base station directly configures a number of a first radio frame of which a start position is aligned with the start position of the uplink and downlink transmission period, and the UE may determine, based on the number of the first radio frame, other radio frames of which the start positions are aligned with start position of the uplink and downlink transmission period, so the determination is simple. At the same time, due to the number of the first radio frame is configured by the base station, different radio frame numbers may be configured according to different requirements, therefore the configuration method is flexible. Based on the same inventive concept, referring to FIG. 7, a UE 70 is further provided in an embodiment of the present disclosure, including:

a processor 71, configured to determine a correspondence relationship between a start position of uplink and downlink transmission period and a start position of radio frame, based on uplink and downlink transmission configuration parameters configured by a base station, where the uplink and downlink transmission configuration parameters include one set of uplink and downlink transmission configuration parameters or two sets of uplink and downlink transmission configuration parameters, and each set of uplink and downlink transmission configuration parameters includes an uplink and downlink transmission period.

In some embodiments of the present disclosure, the processor 71 is further configured to:

in the case that the uplink and downlink transmission configuration parameters include one set of uplink and downlink transmission configuration parameters, a length of a radio frame is capable of including K complete uplink and downlink transmission periods, determine that a start position of a first uplink and downlink transmission period of the K uplink and downlink transmission periods is aligned with a start position of the radio frame, where K is a positive integer.

In some embodiments of the present disclosure, the processor 71 is further configured to:

in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, and a length of a radio frame is capable of including A complete combined periods, determine that a start position of a first combined period of the A combined periods is aligned with a start position of the radio frame, where A is a positive integer.

In some embodiments of the present disclosure, the processor 71 is further configured to:

in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, determine that a number of a radio frame of which a start position is aligned with a start position of a predetermined period in the combined period satisfies SFN mod Nc=M, where SFN is the number of the radio frame, mod is a remainder function, Nc is a ratio of Tc to a length of the radio frame, Tc is a least common multiple of the combined period and the length of the radio frame, and M is a positive integer ranging from 0 to Nc−1.

In some embodiments of the present disclosure, the processor 71 is further configured to:

in the case that the uplink and downlink transmission configuration parameters include one set of uplink and downlink transmission configuration parameters, a length of a radio frame is capable of including K complete uplink and downlink transmission periods, determine that a number of a radio frame of which a start position is aligned with a start position of the uplink and downlink transmission period satisfies $(N_{slot}^{frame,\mu} \cdot n_f + n_{s,f}^{\mu})$ mod N=0, where $\mu$ is an index of a subcarrier interval, N is a quantity of slots with reference to a subcarrier interval corresponding to $\mu$ in a downlink transmission period, $n_{s,f}^{\mu}$ is a slot number in the radio frame, $N_{slot}^{frame,\mu}$ is a quantity of slots with reference to a subcarrier interval corresponding to $\mu$ in one radio frame, and $n_f$ is a number of the radio frame, where K is a positive integer.

In some embodiments of the present disclosure, the processor 71 is further configured to:

in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, determine that a number of a radio frame of which a start position is aligned with a start position of a first uplink and downlink transmission period X in the combined period satisfies $(N_{slot}^{frame,\mu} \cdot n_f + n_{s,f}^{\mu}) mod(N_X=N_Y)=0$, where $\mu$ is an index of a subcarrier interval, $N_X$ is a quantity of slots with reference to a subcarrier interval corresponding to $\mu$ in the uplink and downlink transmission period X, $N_Y$ is a quantity of slots with reference to a subcarrier interval corresponding to $\mu$ in the uplink and downlink transmission period Y, $n_{s,f}^{\mu}$ is a slot number in the radio frame, $N_{slot}^{frame,\mu}$ is a quantity of slots with reference to a subcarrier interval corresponding to $\mu$ in one radio frame, and $n_f$ is a number of the radio frame; and/or determine that a number of a radio frame of which a start position is aligned with a start position of a second uplink and downlink transmission period Y in the combined period satisfies $(N_{slot}^{frame,\mu} \cdot n_f + n_{s,f}^{\mu}) mod(N_X=N_Y)=N_X$.

In some embodiments of the present disclosure, the processor 71 is further configured to: in the case that the uplink and downlink transmission configuration parameters include one set of uplink and downlink transmission configuration parameters, acquire a number of a predefined and aligned radio frame, where a start position of the radio frame corresponding to the number is aligned with a start position of the uplink and downlink transmission period.

In some embodiments of the present disclosure, the processor 71 is further configured to:

in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, acquire a number of a predefined and aligned radio frame, where a start position of the radio frame corresponding to the number is aligned with a start position of a predetermined period in the combined period.

In some embodiments of the present disclosure, the UE further includes a transceiver 70 configured to: in the case that the uplink and downlink transmission configuration parameters include one set of uplink and downlink transmission configuration parameters, receive a number of an aligned radio frame sent by the base station, where a start position of the radio frame corresponding to the number is aligned with a start position of the uplink and downlink transmission period.

In some embodiments of the present disclosure, the UE further includes a transceiver 70 configured to: in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, receive a number of an aligned radio frame sent by the base station, where a start position of the radio frame corresponding to the number is aligned with a start position of a predetermined period in the combined period.

Optionally, the predetermined period in the combined period is the uplink and downlink transmission period corresponding to the first set of uplink and downlink transmission configuration parameters of the two sets of uplink and downlink transmission configuration parameters, or the predetermined period in the combined period is the uplink and downlink transmission period corresponding to the second set of uplink and downlink transmission configuration parameters of the two sets of uplink and downlink transmission configuration parameters.

In some embodiments of the present disclosure, the processor 71 is further configured to: in the case that the uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, determine that a start position of a first radio frame at a time interval T is the same as a start position of a predetermined period in the combined period.

In some embodiments of the present disclosure, the time interval T is predefined, or the time interval T is configured by the base station, or the time interval T is determined based on a period of a synchronization signal block.

The UE in the embodiment of the present disclosure may be a wireless UE or a wired UE. A wireless UE may be a device that provides voice and/or other service data connectivity to users, a handheld device with wireless connection function, or a wireless modem connected to it. Other processing equipment. A wireless UE can communicate with one or more core networks via a Radio Access Network (RAN). The wireless UE can be a mobile UE, such as a mobile phone (or "cellular" phone) and a mobile UE. Computers, for example, can be portable, pocket-sized, handheld, computer-built or vehicle-mounted mobile devices, which exchange language and/or data with the wireless access network. For example, Personal Communication Service (PCS) phones, cordless phones, Session Initiation Protocol (SIP) phones, Wireless Local Loop (WLL) stations, Personal Digital Assistant (PDA) and other equipment. Wireless UE can also be called system, Subscriber Unit, Subscriber Station, Mobile Station), Mobile, Remote Station, Remote Terminal, Access Terminal, User Terminal, User Agent, User Device or User Equipment, which is not limited here.

Referring to FIG. 8, a base station 80 is further provided in an embodiment of the present disclosure, including:

a transceiver 81 configured to send a number of an aligned radio frame, in the case that uplink and downlink transmission configuration parameters configured by the base station include one set of uplink and downlink transmission configuration parameters, where a start position of the radio frame corresponding to the number is aligned with a start position of an uplink and downlink transmission period.

The base station 80 in the embodiment of the present disclosure directly configures the number of the radio frame of which the start position is aligned with the start position of the uplink and downlink transmission period, the determination method is simple, and different radio frame numbers may be configured according to different requirements, so the configuration method is flexible.

Referring to FIG. 9, a base station 90 is further provided in an embodiment of the present disclosure, including:

a transceiver 91 configured to send a number of an aligned radio frame, in the case that uplink and downlink transmission configuration parameters include two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, where a start position of the radio frame corresponding to the number is aligned with a start position of a predetermined period in the combined period.

The base station 90 in the embodiment of the present disclosure directly configures the number of the radio frame of which the start position is aligned with the start position of the uplink and downlink transmission period, the determination method is simple, and different radio frame numbers may be configured according to different requirements, so the configuration method is flexible. The base station in the embodiment of the present disclosure may be a base station (Base Transceiver Station, BTS) in Global System of Mobile Communications (GSM) or Code Division Multiple Access (CDMA), or it may be The base station (NodeB, NB) in Wideband Code Division Multiple Access (WCDMA), can also be the Evolutional Node B (eNB or eNodeB) in LTE, or a relay station or an access point, or base stations in the future 5G network, etc., which are not limited here.

A UE is further provided in the present disclosure, including a memory, a processor and a computer program stored in the memory and executable on the processor, where the processor executes the computer program to perform the method of determining uplink and downlink transmission configuration hereinabove.

A base station is further provided in the present disclosure, including a memory, a processor and a computer program stored in the memory and executable on the processor, where the processor executes the computer program to perform the method of configuring uplink and downlink transmission hereinabove.

A computer-readable storage medium is further provided in the present disclosure, where a computer program is stored in the computer-readable storage medium, and a processor executes the computer program to perform the method of determining uplink and downlink transmission configuration hereinabove, or the processor executes the computer program to perform the method of determining uplink and downlink transmission configuration hereinabove.

A computer-readable storage medium is further provided in the present disclosure, where a computer program is stored in the computer-readable storage medium, and a processor executes the computer program to perform the method of determining uplink and downlink transmission configuration hereinabove, or the processor executes the computer program to perform the method of configuring uplink and downlink transmission hereinabove.

The above-mentioned computer-readable media includes permanent and non-permanent, removable and non-removable media, and information storage can be realized by any method or technology. The information may be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, CD-ROM, digital versatile disc (DVD) or other optical storage, Magnetic cassettes, magnetic tape magnetic disk storage or other magnetic storage devices or any other non-transmission media can be used to store information that can be accessed by computing devices.

The above are some embodiment of the present disclosure. It should be noted that for those of ordinary skill in the art, without departing from the principles of the present disclosure, several improvements and retouches may be made. These improvements and retouches should also be regarded as the scope of the present disclosure.

What is claimed is:

1. A method of determining uplink and downlink transmission configuration, applied to a User Equipment (UE), comprising:

determining a correspondence relationship between a start position of uplink and downlink transmission period and a start position of radio frame, based on uplink and downlink transmission configuration parameters configured by a base station, wherein the uplink and downlink transmission configuration parameters comprise two sets of uplink and downlink transmission configuration parameters, and each set of uplink and downlink transmission configuration parameters comprises an uplink and downlink transmission period;

wherein in the case that the uplink and downlink transmission configuration parameters comprise two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission;

the determining the correspondence relationship between the start position of uplink and downlink transmission period and the start position of radio frame comprises:

determining that a number of a radio frame of which a start position is aligned with a start position of a predetermined period in the combined period satisfies SFN mod Nc=M, wherein SFN is the number of the radio frame, mod is a remainder function, Nc is a ratio of Tc to a length of the radio frame, Tc is a least common multiple of the combined period and the length of the radio frame, and M is a positive integer ranging from 0 to Nc−1;

or, in the case that the uplink and downlink transmission configuration parameters comprise two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission;

the determining the correspondence relationship between the start position of uplink and downlink transmission period and the start position of radio frame comprises:

determining that a number of a radio frame of which a start position is aligned with a start position of a first uplink and downlink transmission period X in the combined period satisfies $(N_{slot}^{frame,\mu} \cdot n_f + n_{s,f}^{\mu}) \mod (N_X+N_Y)=0$, wherein $\mu$ is an index of a subcarrier interval, $N_X$ is a quantity of slots with reference to a subcarrier interval corresponding to $\mu$ in the uplink and downlink transmission period X, $N_Y$ is a quantity of slots with reference to a subcarrier interval corresponding to ti in the uplink and downlink transmission period Y, $n_{s,f}^{\mu}$ is a slot number in the radio frame, $N_{slot}^{frame,\mu}$ is a quantity of slots with reference to a subcarrier interval corresponding to $\mu$ in one radio frame, and $n_f$ is a number of the radio frame; and/or determining that a number of a radio frame of which a start position is aligned with a start position of a second uplink and downlink transmission period Y in the combined period satisfies $(N_{slot}^{frame,\mu} \cdot n_f + n_{s,f}^{\mu}) \mod (N_X+N_Y)=N_X$;

or, in the case that the uplink and downlink transmission configuration parameters comprise two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission;

the determining the correspondence relationship between the start position of uplink and downlink transmission period and the start position of radio frame comprises:

acquiring a predefined radio frame number for alignment, wherein a start position of the radio frame corresponding to the number is aligned with a start position of a predetermined period in the combined period;

or, in the case that the uplink and downlink transmission configuration parameters comprise two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission;

the determining the correspondence relationship between the start position of uplink and downlink transmission period and the start position of radio frame comprises:

receiving a radio frame number for alignment sent by the base station, wherein a start position of the radio frame corresponding to the number is aligned with a start position of a predetermined period in the combined period;

or in the case that the uplink and downlink transmission configuration parameters comprise two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission;

the determining the correspondence relationship between the start position of uplink and downlink transmission period and the start position of radio frame comprises:

determining that a start position of a first radio frame of every time interval T is the same as a start position of a predetermined period in the combined period.

2. The method according to claim 1, wherein the predetermined period in the combined period is the uplink and downlink transmission period corresponding to the first set of uplink and downlink transmission configuration parameters of the two sets of uplink and downlink transmission configuration parameters, or the predetermined period in the combined period is the uplink and downlink transmission period corresponding to the second set of uplink and downlink transmission configuration parameters of the two sets of uplink and downlink transmission configuration parameters.

3. The method according to claim 1,
wherein the time interval T is predefined, or the time interval T is configured by the base station, or the time interval T is determined based on a period of a synchronization signal block.

4. A method of configuring uplink and downlink transmission, applied to a base station, comprising:
sending a number of an aligned radio frame, in the case that uplink and downlink transmission configuration parameters comprise two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, wherein a start position of the radio frame corresponding to the number is aligned with a start position of a predetermined period in the combined period.

5. A base station, comprising a memory, a processor and a computer program stored in the memory and executable on the processor, wherein the processor executes the computer program to perform the method of configuring uplink and downlink transmission according to claim 4.

6. A User Equipment (UE), comprising:
a processor, configured to determine a correspondence relationship between a start position of uplink and downlink transmission period and a start position of radio frame, based on uplink and downlink transmission configuration parameters configured by a base station,
wherein the uplink and downlink transmission configuration parameters comprise two sets of uplink and downlink transmission configuration parameters, and each set of uplink and downlink transmission configuration parameters comprises an uplink and downlink transmission period;
wherein
the processor is further configured to:
in the case that the uplink and downlink transmission configuration parameters comprise two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission,
determine that a number of a radio frame of which a start position is aligned with a start position of a predetermined period in the combined period satisfies SFN mod Nc=M, wherein SFN is the number of the radio frame, mod is a remainder function, Nc is a ratio of Tc to a length of the radio frame, Tc is a least common multiple of the combined period and the length of the radio frame, and M is a positive integer ranging from 0 to Nc−1;
or,
the processor is further configured to:
in the case that the uplink and downlink transmission configuration parameters comprise two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission,
determine that a number of a radio frame of which a start position is aligned with a start position of a first uplink and downlink transmission period X in the combined period satisfies $(N_{slot}^{frame,\mu} \cdot n_f + n_{s,f}^{\mu}) \mod (N_X + N_Y) = 0$, wherein $\mu$ is an index of a subcarrier interval, $N_X$ is a quantity of slots with reference to a subcarrier interval corresponding to $\mu$ in the uplink and downlink transmission period X, $N_Y$ is a quantity of slots with reference to a subcarrier interval corresponding to $\mu$ in the uplink and downlink transmission period Y, $n_{s,f}^{\mu}$ is a slot number in the radio frame, $N_{slot}^{frame,\mu}$ is a quantity of slots with reference to a subcarrier interval corresponding to $\mu$ in one radio frame, and $n_f$ is a number of the radio frame; and/or
determine that a number of a radio frame of which a start position is aligned with a start position of a second uplink and downlink transmission period Y in the combined period satisfies $(N_{slot}^{frame,\mu} \cdot n_f + n_{s,f}^{\mu}) \mod (N_X + N_Y) = N_X$;
or,
the processor is further configured to:
in the case that the uplink and downlink transmission configuration parameters comprise two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission,
acquiring a predefined radio frame number for alignment, wherein a start position of the radio frame corresponding to the number is aligned with a start position of a predetermined period in the combined period;
or,
the UE further comprises a transceiver configured to: in the case that the uplink and downlink transmission configuration parameters comprise two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, receive a number of an aligned radio frame sent by the base station, wherein a start position of the radio frame corresponding to the number is aligned with a start position of a predetermined period in the combined period;

or the processor is further configured to: in the case that the uplink and downlink transmission configuration parameters comprise two sets of uplink and downlink transmission configuration parameters, an uplink and downlink transmission period in a first set of uplink and downlink transmission configuration parameters is X, an uplink and downlink transmission period in a second set of uplink and downlink transmission configuration parameters is Y, and the uplink and downlink transmission periods in the two sets of uplink and downlink transmission configuration parameters constitute a combined period X+Y for transmission, determining that a start position of a first radio frame of every time interval T is the same as a start position of a predetermined period in the combined period.

7. The UE according to claim 6, wherein the predetermined period in the combined period is the uplink and downlink transmission period corresponding to the first set of uplink and downlink transmission configuration parameters of the two sets of uplink and downlink transmission configuration parameters, or the predetermined period in the combined period is the uplink and downlink transmission period corresponding to the second set of uplink and downlink transmission configuration parameters of the two sets of uplink and downlink transmission configuration parameters.

8. The UE according to claim 6, wherein the time interval T is predefined, or the time interval T is configured by the base station, or the time interval T is determined based on a period of a synchronization signal block.

\* \* \* \* \*